(12) United States Patent
Passler

(10) Patent No.: US 9,877,149 B2
(45) Date of Patent: *Jan. 23, 2018

(54) ASSISTED PASSIVE GEO-LOCATION OF A WIRELESS LOCAL AREA NETWORK DEVICE

(71) Applicant: SR Technologies, Inc., Davie, FL (US)

(72) Inventor: Mark Passler, Boca Raton, FL (US)

(73) Assignee: SR Technologies, Inc., Davie, FL (US)

( * ) Notice: Subject to any disclaimer, the term of this patent is extended or adjusted under 35 U.S.C. 154(b) by 191 days.

This patent is subject to a terminal disclaimer.

(21) Appl. No.: 14/989,338

(22) Filed: Jan. 6, 2016

(65) Prior Publication Data

US 2016/0277882 A1 Sep. 22, 2016

Related U.S. Application Data

(60) Provisional application No. 62/133,749, filed on Mar. 16, 2015.

(51) Int. Cl.
*H04W 4/02* (2009.01)
*H04L 12/26* (2006.01)

(52) U.S. Cl.
CPC ........... *H04W 4/02* (2013.01); *H04L 43/0852* (2013.01)

(58) Field of Classification Search
CPC combination set(s) only.
See application file for complete search history.

(56) References Cited

U.S. PATENT DOCUMENTS

| 9,618,603 B2* | 4/2017 | Ben-Haim | G01S 5/10 |
| 9,693,187 B2* | 6/2017 | Passler | H04W 4/02 |
| 2008/0158059 A1* | 7/2008 | Bull | G01S 5/06 342/387 |
| 2010/0098204 A1* | 4/2010 | Ratiu | H04J 3/0638 375/371 |
| 2011/0249688 A1* | 10/2011 | Liu | H04W 56/002 370/503 |
| 2012/0155497 A1* | 6/2012 | Lee | H04J 3/0697 370/507 |
| 2012/0229334 A1* | 9/2012 | Waters | G01S 19/05 342/357.42 |
| 2013/0286959 A1* | 10/2013 | Lou | H04W 72/04 370/329 |
| 2014/0045522 A1* | 2/2014 | Sugar | H04W 4/023 455/456.1 |
| 2014/0113547 A1* | 4/2014 | Kwak | H04W 8/005 455/39 |
| 2014/0241240 A1* | 8/2014 | Kloper | H04W 16/28 370/328 |
| 2017/0030998 A1* | 2/2017 | Passler | G01S 5/14 |

* cited by examiner

*Primary Examiner* — Steven Kelley
(74) *Attorney, Agent, or Firm* — Christopher & Weisberg, P.A.

(57) ABSTRACT

An assisted passive geo-location method and system for determining the location of a wireless device. The method includes passive location techniques in order to assist in determining the location of the wireless device and active techniques in order to assist in the calculation of the relative drift between the clock associated with the wireless device and the clock associated with the measuring station.

12 Claims, 9 Drawing Sheets

ASSISTED PASSIVE GEO-LOCATION OF A WIRELESS LOCAL AREA NETWORK DEVICE

CROSS-REFERENCE TO RELATED APPLICATION

This application is related to and claims priority to U.S. Provisional Patent Application Ser. No.: 62/133,749, filed Mar. 16, 2015 entitled "GEO-LOCATION OF A WIRELESS LOCAL AREA NETWORK DEVICE" the entirety of which is incorporated herein by reference.

STATEMENT REGARDING FEDERALLY SPONSORED RESEARCH OR DEVELOPMENT n/a

TECHNICAL FIELD

The present disclosure relates to a method and system for geo-location of wireless devices and in particular to the geo-location of wireless local area network (WLAN) devices.

BACKGROUND

The location of WLAN devices can be performed by various means. Of particular interest for this disclosure is the location of devices that are based upon the IEEE 802.11 technology, commonly known as Wi-Fi. Various methods can be used to locate an access point (AP), or a station (STA). These methods may be classified as active, passive and combined active and passive. In an active location scheme, a device that is determining the location or range, the measuring device, transmits certain packets to the device being located, the target device, and the common method is to measure the time of arrival (TOA) of the response from the target device and compare that to the time of departure (TOD) that the packet was transmitted by the measuring device. In a passive location scheme, a measuring device simply monitors the TOAs of non-stimulated transmissions from the target device.

In such location systems it is common to use multiple measuring devices to determine the location. In such a scheme simultaneous TOA and/or TOD measurements are taken by different measuring devices situated at different points and the location of the target device calculated. For example, in a passive location scheme, the TOA of a transmission from the target can be simultaneously received at several sites. The difference in the TOAs between two sites is known as the time difference of arrival (TDOA). The TDOA is related to the difference in path lengths between the target and each receiving site, and for each pair of receivers the TDOA results in a hyperbola along which the location of the target lies. The addition of a third site will provide a second hyperbola and the location of the target will be indicated by the interception of the two hyperbolas.

In an active location scheme, TOD may be measured for a packet that is transmitted from the measuring station addressed to the target station. The TOA of the response from the target station at the measuring station is then also measured. If the turnaround time for the target station to receive the packet from the measuring station and to start to transmit the response is known, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the packet transmitted from the measuring station to the target station is a data packet, the response from the target station will normally be an acknowledgement (ACK) packet. If the packet transmitted from the measuring station to the target station is a control packet, for example a ready-to-send (RTS) packet, then the response from the target station will normally be a clear-to-send (CTS) packet. In these two examples, the turnaround time at the target station is defined in the IEEE 802.11 standard as the short interframe spacing (SIFS) which is a preset value. Hence, the time delay, td, between the measuring station and the target station may be determined from the calculation td=(TOA−TOD−SIFS)/2 and the distance between the measuring station and the target station is then td/c, where c is the speed of light. This method of estimating the distance to a target station by measuring the TOD and TOA and accounting for the turnaround time is known in the art.

SUMMARY

The present disclosure advantageously provides a method and measuring station for geo-location of wireless devices using an assisted passive location scheme. In one aspect of the disclosure, a method for determining a location of a wireless device is provided. The method includes identifying a departure time difference between a first Time of Departure ($TOD_n$) of a first beacon transmitted from the wireless device according to a clock associated with the wireless device, and a second $TOD_m$ of a second beacon transmitted from the wireless device according to the clock associated with the wireless device, and identifying an arrival time difference between a first Time of Arrival ($TOA_n$) of the first beacon at the measuring station according to a clock associated with the measuring station and a second $TOA_m$ of the second beacon at the measuring station according to the clock associated with the measuring station. The method also includes determining a first propagation time $\delta_n$ represented by a time interval between sending, by the measuring station, a first ranging packet to the wireless device and receiving, by the wireless device, the first ranging packet, and determining a second propagation time $\delta_m$ represented by a time interval between sending, by the measuring station, a second ranging packet to the wireless device and receiving, by the wireless device, the second ranging packet. The method also includes determining a relative drift between the clock associated with the wireless device and the clock associated with the measuring station, the relative drift based at least upon the departure time difference, the arrival time difference, the first propagation time $\delta_n$ and the second propagation time $\delta_m$. The location of the wireless device is determined based at least in part on the determined relative drift.

In another aspect of the disclosure, a measuring station for determining a location of a wireless device is provided. The measuring station includes an interface configured to transmit, to the wireless device, a first and second ranging packets, and receive, from the wireless device, first and second beacons. The measuring station also includes a processor, and a memory storing instructions that, when executed, configure the processor to identify a departure time difference between a first Time of Departure ($TOD_n$) of the first beacon transmitted from the wireless device according to a clock associated with the wireless device, and a second $TOD_m$ of a second beacon transmitted from the wireless device according to the clock associated with the wireless device, and identify an arrival time difference between a first Time of Arrival ($TOA_n$) of the first beacon at the measuring station according to a clock associated with the measuring station and a second $TOA_m$ of the second beacon at the measuring station according to the clock associated with the measuring station. The processor is also configured to determine a first propagation time $\delta_n$ represented by a time interval between sending the first ranging packet to the wireless device and receipt of the first ranging packet by the wireless device, and determine a second propagation time $\delta_m$ represented by a time interval between sending the second ranging packet to the wireless device and receipt of the second ranging packet by the wireless device. The processor is further configured to determine a relative drift between the clock associated with the wireless device and the clock associated with the measuring station, the relative drift based at least upon the departure time difference, the arrival time difference, the first propagation time $\delta_n$ and the second propagation time $\delta_m$, and determine the location of the wireless device based at least in part on the determined relative drift.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 4 depicts a scenario where a measuring station is moving between two points;

DETAILED DESCRIPTION

In one embodiment of the present disclosure, a single measuring device is used partly in a passive mode and partly in an active mode such that the result is an improved location measurement as compared with known techniques. The present disclosure describes a method for using the active measurement of the distance to a target station, and using the active measurement of the distance together with the results obtained using a passive location method.

A method is proposed that determines the location of a target wireless station using a single wireless measuring station, incorporating a passive location method assisted by an active ranging measurement. In one embodiment, the target station is an access point conforming to the IEEE 802.11 standard and the measuring station may also be a device that conforms to the IEEE 802.11 standard.

Figure 1:
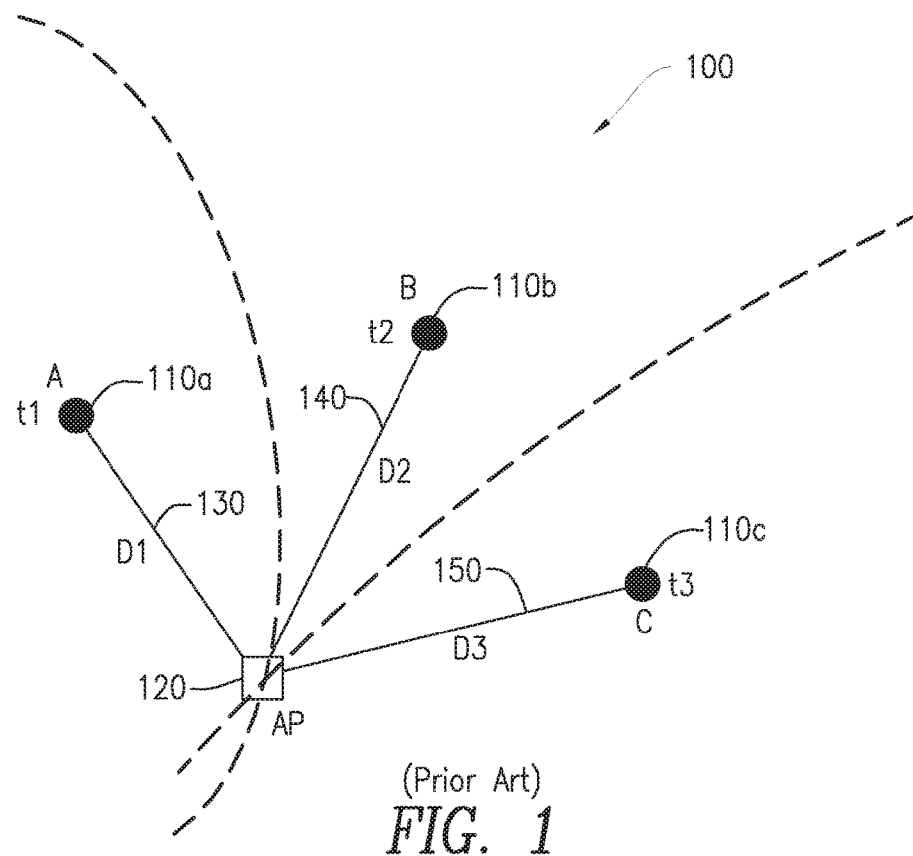
FIG. 1 is a diagram of a typical passive location system consisting of multiple measuring stations.

First consider the following review of the TDOA passive method so that differences with the proposed method of the present disclosure can be elucidated. FIG. 1 is a diagram of a typical passive location system 100 which includes three measuring stations 110a, 110b and 110c (referred to collectively herein as "measuring stations" or "measuring receivers"). The target 120 is a wireless device, such as, for example, an Access Point (AP) that is to be located by the three measuring stations 110. The distance of the AP 120 from receiving station 110a is D1, 130. The distance of the AP 120 from receiving station 110b is D2, 140. The distance of the AP 120 from receiving station 110c is D3, 150. A transmission from the AP 120 is received at each of the three measuring stations 110a, 110b, and 110c, at times t1, t2, and t3 which are directly related to the distances D1, 130, D2, 140 and D3, 150. If the transmission from the AP, 120, is at time T1, then it will be received at a measuring station at time (T1+D/c) where D is the distance of the measuring station from the AP 120, and c is the speed of light. Hence, t1=T1+D1/c, t2=T1+D2/c and t3=T1+D3/c. The TDOA for the measuring stations 110a and 110b is therefore TDOA12=t1−t2=(D1−D2)/c, and the TDOA for the measuring stations 110b and 110c is TDOA23=t2−t3=(D2−D3)/c. The methods for calculating the intersections of the two resulting hyperbolas are well known in the art.

Figure 2:
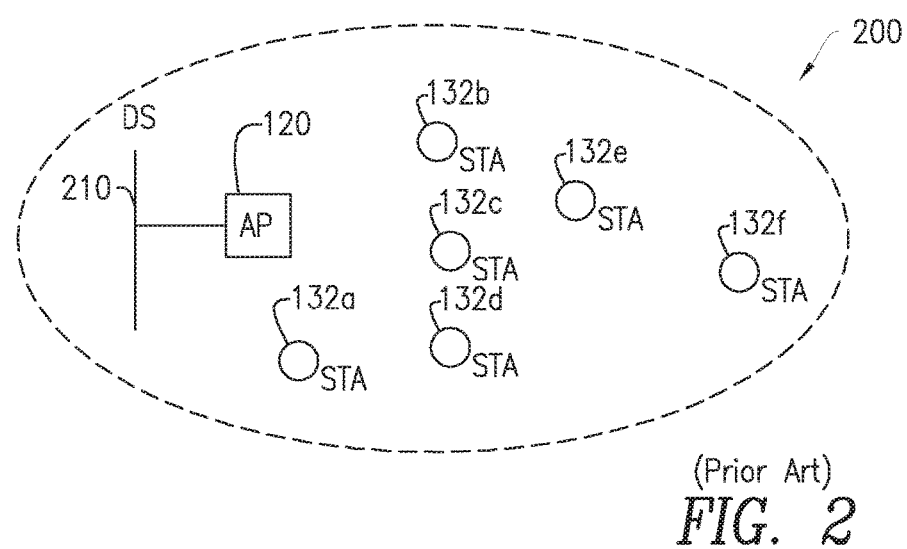
FIG. 2 is a block schematic diagram of a typical IEEE 802.11 infrastructure network.

FIG. 2 is a block schematic diagram of a typical IEEE 802.11 infrastructure network 200. A number of stations, 132a, 132b, 132c, 132d, 132e and 132f are associated to an access point, AP, 120 which, in turn, is connected to a hard wired distribution system, DS, 210. In such a network, the AP 120 will transmit beacons periodically in order to allow mobile stations to locate and identify the network and to convey information to stations, in particular the timestamp, beacon interval and capability information.

Figure 3:
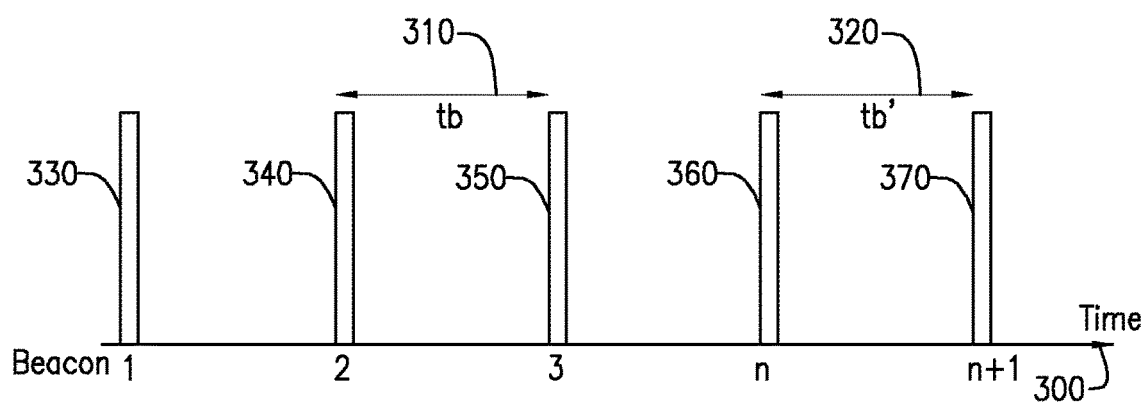
FIG. 3 is a diagram depicting the transmission of a series of beacons over time by a wireless device.

FIG. 3 is a diagram that depicts the transmissions of beacons by AP 120 in an IEEE 802.11 infrastructure network with respect to the time axis 300. The AP 120 in FIG. 2, will attempt to transmit beacons 330, 340, 350, 360 and 370 at time interval, tb, 310, known as Target Beacon Transmission time, TBTT. In practice, the time tb' 320 between the two beacons may be greater than TBTT. The AP 120 advertises this ideal interval, TBTT, in the beacon frame. The beacon transmission may be delayed beyond TBTT because of other traffic. In addition, because a beacon is never retransmitted, if the reception of the beacon at a station is corrupted for any reason, it is possible that that station may not receive every beacon. A field that is included in the beacon packet and is transmitted within every beacon is the Timestamp which is 64 bits long and contains the value of the AP's synchronization timer at the time that the frame was transmitted. This is known as the timer synchronization function (TSF). In an infrastructure network associated stations will update their own TSF timer with the value of the timer it receives from the AP 120 in the beacon frame, modified by any processing time required to perform the update operation. This way associated stations maintain synchronous timing with the AP 120. In the case that the beacon TOA is being measured by an un-associated measuring station, then the measuring station will not update its timer to synchronize with the AP TSF. A common tolerance for the clock within an AP 120 is about 3 ppm and at a first approximation it may be assumed that the clocks of the AP 120 and of the measuring station maintain a constant drift with respect to absolute time, and it is desirable that this relative drift between the clocks be assessed.

FIG. 4a, FIG. 4b, FIG. 4c and FIG. 4d describe the measurement process of the disclosure and depict a scenario where a measuring receiver 400, utilizing the principles of the present disclosure, is moving between points A 402 and B 404 on a path 406. It is noted that although the term "measuring receiver" is used in this instance, that term is not intended to limit device 400 to have only signal receiving capability. Rather, measuring receiver 400 may include a transmitter and associated software and/or hardware to enable measuring receiver 400 to both transmit and to receive signals that include data packets to and from other wireless devices.

Figure 4A:
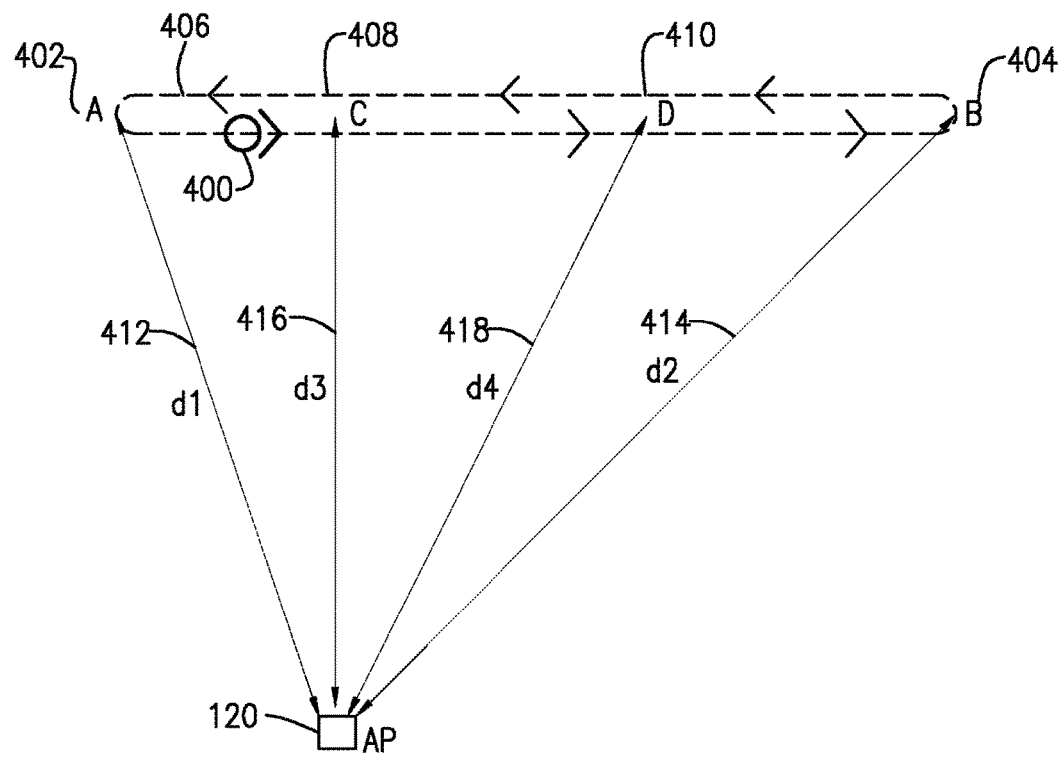
FIG. 4a is a diagram depicting a measuring station moving in a pattern between two points utilizing the principles of the present disclosure.

In FIG. 4a, measuring receiver 400 is moving in a certain path 406 and measuring the TOAs of the beacons from an AP 120. In this example, measuring receiver 400 starts at position A 402, and then moves to point B 404, via points C 408 and D 410. When measuring receiver 400 reaches point B 404, measuring receiver 400 reverses and travels back to point A 402, again via points C 408 and D 410. As measuring receiver 400 moves along the path 406, measuring receiver 400 is constantly measuring the TOA of the beacons that are transmitted by the AP 120. The distances between the measuring receiver 400 and the AP 120 when the measuring receiver 400 is at points A 402, B 404, C 408 and D 410 are d1 412, d2 414, d3 416 and d4 418 respectively. If the time that each beacon is transmitted, the time of departure TOD, is known, then the time of flight TOF of the transmission is TOA-TOD. The TOF of the beacon transmission from AP 120, to the measuring receiver 400 will be proportional to the distance between the measuring receiver 400 and the AP 120 at each point. Many different patterns for the measuring receiver 400 may be used and the pattern depicted by path 406 is just one of many possible patterns.

Figure 4B:
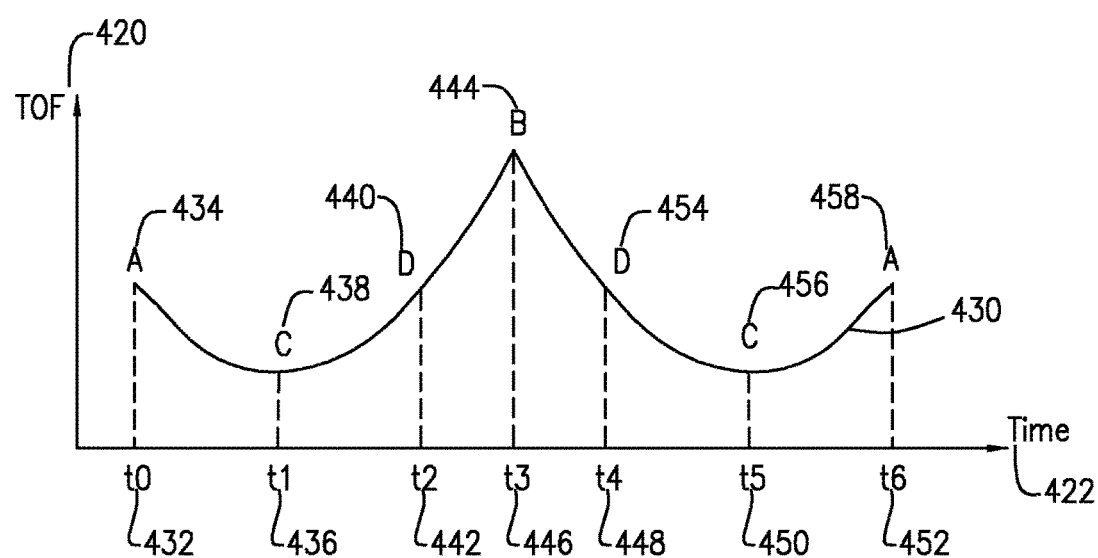
FIG. 4b is a graph depicting the Time of Flight (TOF) of beacons transmitted by a wireless device utilizing the principles of the present disclosure.

FIG. 4b is a graph 430 depicting the TOF axis 420 of the beacons transmitted by AP 120 as measured by the measuring receiver 400 against time 422. The measuring receiver 400 periodically or continuously measures the TOA of the beacons from AP 120 as it moves from position A 402 to position B 404 and back. For the moment, assume that the clocks of the AP 120 and the measuring receiver 400 are perfectly aligned and the TOD of each beacon is known. The resulting graph 430 is the variation of TOF against time 422. The TOA measurements are carried out for every beacon transmission. At time t0 432, the measuring receiver 400 measures the TOA for point A 402 and calculates TOF 434. At time t1 436, the measuring receiver 400 measures the TOA for point C 408 and calculates TOF 438. Point C 408, in this example, is closer to the AP 120 than point A 402, and this is shown by TOF 438 which is less than TOF 434. Point D 410 is at a similar distance from the AP 1120 as is point A 402 and hence the corresponding TOF 440, measured at time t2 442, is a similar value to TOF 434. Point B 404 is the furthest distance from the AP 120 and hence the TOF 444, measured at time t3 446 is greater than those measured at times t0 432, t1 436 and t2 442. After time t3 446, the measuring receiver 400 is moving back from point B 404 towards point A 402 and at times t4 448, t5 450 and t6 452, the TOFs 454, 456 and 458, corresponding to points D 410, C 408 and A 402 are again measured. The graph 430 in FIG. 4b of the measured TOF 420 against time 422 is ideal and assumes that the clocks at the AP 120 and the measuring receiver 400 are perfectly aligned. In practice, this will not be the case and it is necessary for the relative clock drift and offset to be determined.

In the example depicted in FIG. 4a and FIG. 4b, the measuring receiver 400 periodically or continuously measures the TOAs of the beacons from the AP 120 as the measuring receiver 400 moves along the path 406 and calculates TOFs. If the TOA measurements and the TOF calculations are accurate, then the time differences between points can be calculated and the location of the AP 120 determined using a formula developed for TDOA location. Several such formulas are well known and this final calculation of the actual location, using the time differences, does not form part of this disclosure. This disclosure is concerned with using the TSF timer in the beacon, the TOA measurement by the measuring receiver 400 and the elimination of the relative drift and offset between the clocks of the AP 120 and the measuring receiver 400. In addition, it should be noted that, as defined in the IEEE 802.11 standard and in accordance with one embodiment, the TSF field of the beacon is in 1 µs increments. However, the present disclosure is not limited to solely 1 µs increments. Other increment sizes can be used.

One method of measuring the TOA of the beacon at the measuring receiver 400 is to use the internal TSF timer of the measuring receiver 400. In this case, the TOA time would also be in 1 µs increments. To distinguish between the case where TOAs are recorded simultaneously by measuring receivers 400 at several locations, with the scheme that is described in this disclosure, where a single mobile measuring receiver is used, the term "difference time of arrival" (DTOA) is used rather than TDOA. It should be noted, however, that the method described in this disclosure may be extended to the use of two or more mobile measuring receivers 400 and is not limited to just one.

In consideration that the timer on the AP 120 and the timer on the measuring receiver 400 are rarely aligned, two terms will be defined, α, the offset between the two timers at some time and β, the relative drift between the two timers. The time that AP 120 transmits its beacon, the TSF time, is included in a field in the beacon transmission packet. Hence, the measuring receiver 400 that receives the beacon knows the time that the beacon is transmitted, the TOD as measured by the AP's clock. Similarly the time that the beacon was received, TOA, as measured by the measuring receiver's clock, is also known.

For the reception of the first beacon: $TOA_1 = \alpha + \beta * TOD_1 + \delta_1$ (1)

Where α is the offset between the TSF clock in the AP 120 and the clock in the measuring receiver 400, where β is the relative drift between the two clocks and δ is the time delay due to the distance from the AP 120 to the receiver.

For the nth beacon: $TOAn = \alpha + \beta * TODn + \delta n$ (2)

Similarly for the mth beacon: $TOAm = \alpha + \beta * TODm + \delta m$ (3)

The value of β is determined as:

$TOAn - TOAm = \beta(TODn - TODm) + (\delta n - \delta m)$ (2)-(3)

Rearranging $\beta = [(TOAn - TOAm) - (\delta n - \delta m)]/(TODn - TODm)$ (4)

In equation (4) the term (δn−δm) is unknown. A method proposed in this disclosure is to calculate a value for the relative drift of the AP 120 and measuring receiver clocks, β, based upon the measurements of the propagation time δ at various points using an active transmission from a measurement station to the target AP 120 and measuring the TOD and TOA. This procedure may be referred to as "active ranging." With values for the time delays at various points, the value for β may then be estimated as shown in equation (4). The value for β may be updated each time a new active ranging calculation is carried out. The updated value may take account of the elapsed times between the measurements, for example the longer the time difference the better the calculated value for β. It is common practice to use the internal TSF timer of the measuring station as the time clock and in this case it should be noted that the TOD and TOA times may be in increments of 1 μs although the present disclosure is not limited to solely 1 μs increments. Noting the fact that this is wireless propagation, in practice there may therefore be a noise component in the order of ±1 μs on each measurement. The errors, however, will tend to be noisy or Gaussian and can be reduced by the mathematical techniques mentioned above. Hence, by using the TOD and TOA times taken at various positions that differ in time, the resulting value for β can be used to correct the timing measurements and hence provide an accurate estimation for the location of the AP 120. In general, the more time that has elapsed between the two active ranging measurements, the more accurate the resulting value for the relative drift, β. For example, in order to measure a relative drift between the AP 120 clock and the measuring station clock to an accuracy of 0.1 ppm, a time difference of 10 seconds between the TOA measurements, or the transmission of about 100 beacons, is required.

Figure 4C:
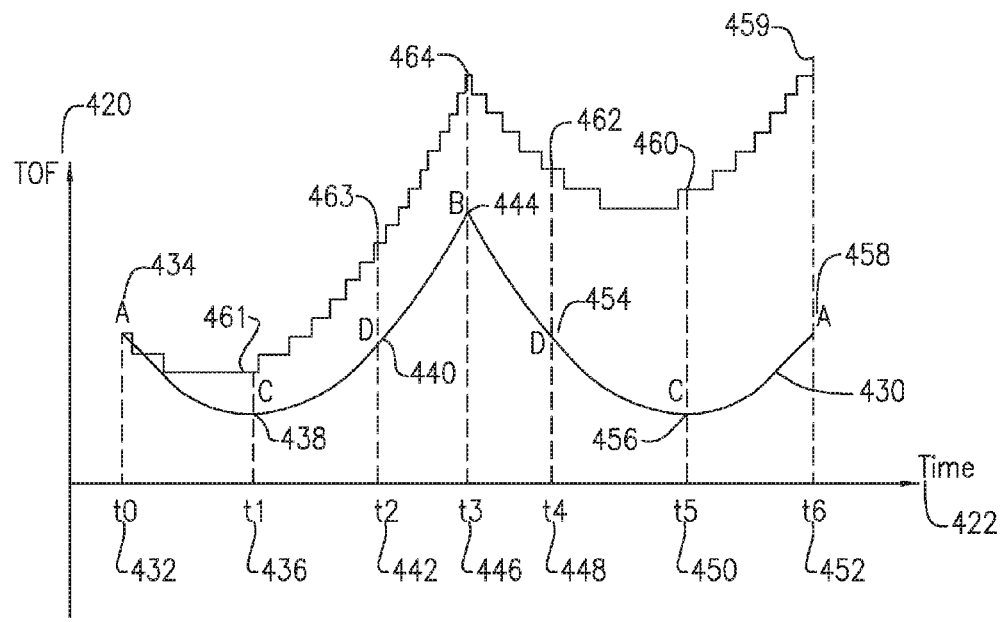
FIG. 4c is the graph depicted in FIG. 4b, including a graph of raw TOF measurements utilizing the principles of the present disclosure.

The graph in FIG. 4c is a re-plot of the graph 430 depicted in FIG. 4b, now allowing the clock on the AP 120 to not be aligned with the clock on the measuring receiver 400 but where a relative drift β of 0.1 ppm exists, and a zero offset a at the start time. Both TSF and TOA times are in increments of 1 μs, and a noiseless propagation environment is assumed. As time increases, the error in the TOF calculation progressively increases due to the 0.1 ppm relative drift between the measuring receiver and the AP clocks. At time t6, 452, when the measuring receiver 400 has returned to point A 402, first visited at time t0 432, the calculated TOF 459 is significantly in error compared to the true TOF 458. This error is directly related to the elapsed time (t6−t0) multiplied by the relative drift of 0.1 ppm. Similarly comparing the pairs of measurements where the receiving receiver 400 is at the same points, the calculated TOF 460 is larger than TOF 461 for point C 408, at times t5 450 and t1 436; the calculated TOF 462 is larger than TOF 463 for point D 410, at times t4 448 and t2 442; and when the measuring receiver 400 is at point B 404, the error is shown by the difference in the calculated TOF 464 and the true TOF 444. Of note, in the case that the actual relative drift was, say, 4 ppm, and if the relative drift is corrected to within 0.1 ppm, then there is still a significant error as shown in FIG. 4c. Hence, the relative drift between the two clocks must be compensated for as accurately as possible.

Figure 4D:
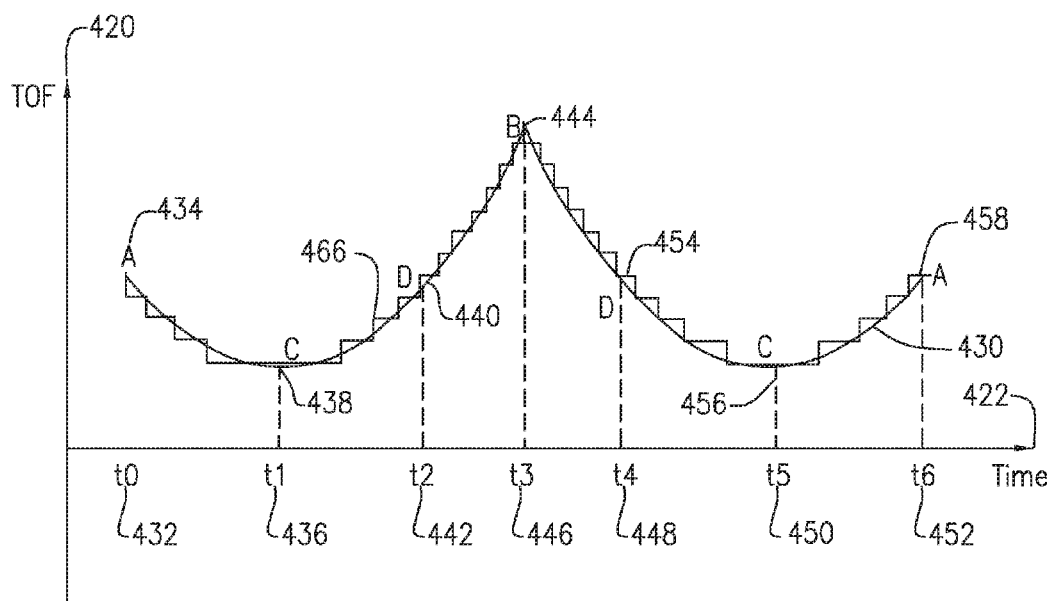
FIG. 4d is the graph depicted in FIG. 4b, including a graph of corrected TOF measurements utilizing the principles of the present disclosure.

The graph in FIG. 4d is a re-plot of the graph 430 depicted in FIG. 4b. The graph in FIG. 4d again shows the ideal TOF measurements, 430, plus a graph of corrected TOF measurements, 466, where the relative drift β has been reduced to 0.005 ppm, both TOF and TOA times are in increments of 1 μs, and a noiseless propagation environment is assumed. The progressive error as shown in FIG. 4c is reduced significantly in FIG. 4d, demonstrating a desire to determine an accurate value for the relative drift β. To achieve this degree of accuracy ideally the value for β should be calculated using the TOD and TOA readings from beacons that are separated in time by an amount that is as large as practical. Well known mathematical techniques used to determine the location of an emitter using TDOA involve the filtering of the results and reducing the errors using techniques such as least squares. Such techniques in practice allow that the precision for the value of the relative clock drift β can be reduced. However, it is fair to state that the better the precision of the value for β, the better the accuracy of the final location estimate.

An exemplary method proposed in this disclosure is to calculate a value for the relative drift of the AP 120 and measuring receiver clocks, β, by carrying out active ranging at points n and m such that the value for (δn−δm) is known, as shown in equation (4). The value for β can then be estimated using the time difference between the two TOA measurements and the TOD values as shown in equation (4). The value for β may be updated each time a new active ranging is carried out. The updated value may take account of the elapsed times between the measurements, for example the longer the time difference, the better the calculated value for β. It should be noted that as the TOD and TOA times may be in increments of 1 μs, and the fact that this is wireless propagation, in practice, there may be a noise component in the order of ±1 μs on each measurement. The errors, however, will tend to be noisy or Gaussian and may be reduced by the mathematical techniques mentioned beforehand. Hence, by using the TOD and TOA times taken at positions that are close to each other, in practice the resulting value for β can be used to provide an accurate estimation for the location of the AP 120. The method as described in this disclosure enables the estimation of the location of a target AP 120 using well known TDOA formulas but where a single mobile measuring receiver 400 is used. The mobile measuring receiver 400 may be located in a ground vehicle, a vessel at sea or on water or in a vehicle that is airborne.

Figure 5:
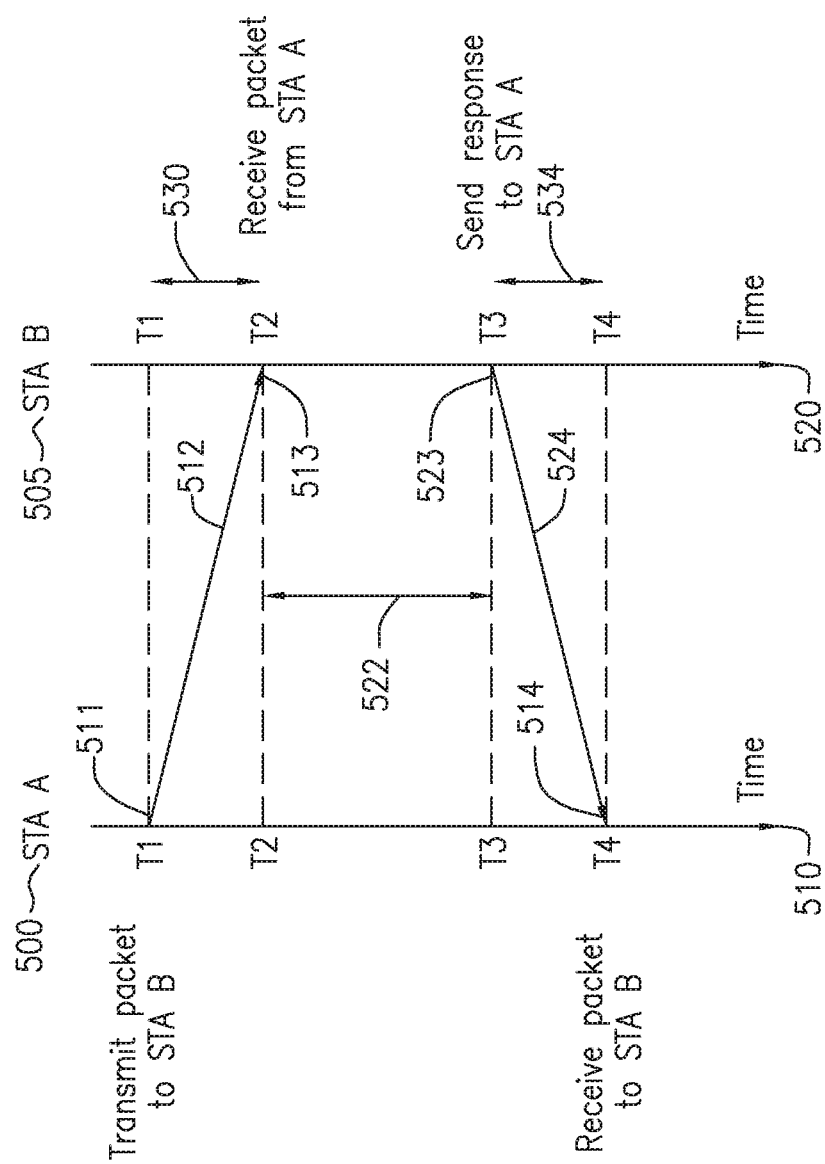
FIG. 5 is a timing diagram describing an active ranging method determining the distance between two stations utilizing the principles of the present disclosure.

FIG. 5 is a timing diagram that describes the ranging method of the present disclosure that may be used to determine the distance between two wireless devices, wireless device STA A 500 and wireless device STA B 505. In one embodiment, one of the wireless devices (i.e., one of STA A 500 and STA B 505) is AP 120. In another embodiment, at least one of wireless devices (i.e., at least one of STA a 500 and STA B 505) is measuring receiver 400. Time axis 510 refers to the time axis for STA A 500 and time axis 520 refers to the time axis for STA B 505. At time T1 511, STA A 500 transmits a packet to STA B 505. This transmission 512 is received at STA B 505 at time T2 513. The propagation time of the transmission 512 is (T2−T1) 530. STA B 505 transmits a response 524 at time T3 523. The time 522 that has elapsed between the reception of the packet at time T2 513 and the transmission at time T3 523 is the turnaround time at STA B 505. Ideally the turnaround time 522 at STA B will be equal in duration to SIFS. At time T4 514, STA A 500 receives the response 524 from STA B 505. The propagation time of the transmission 524 is (T4−T3) 534. It should be noted that the time differences 530 (T2−T1) and 534 (T4−T3) represent the propagation time, δ, of the transmissions and should be equal assuming the distance between the two stations has not changed. The total time that elapses between the transmission 512 and the response 524 at STA A 500 is $$(T2-T1)+(T3-T2)+(T4-T3)=(T4-T1)=\delta+\text{SIFS}+\delta \quad (5)$$

Hence, $\delta=(T4-T1-\text{SIFS})/2$ (6)

Expression (6) is a simplified equation that is included so as to provide the basic idea of the ranging transmission method. Note that the duration of the transmitted packet and the response packet is not accounted for in equation (5). Note that in practice it is common that the timestamp of a packet is set to coincide with the end of the packet at the point where the frame check is completed.

Figure 6:
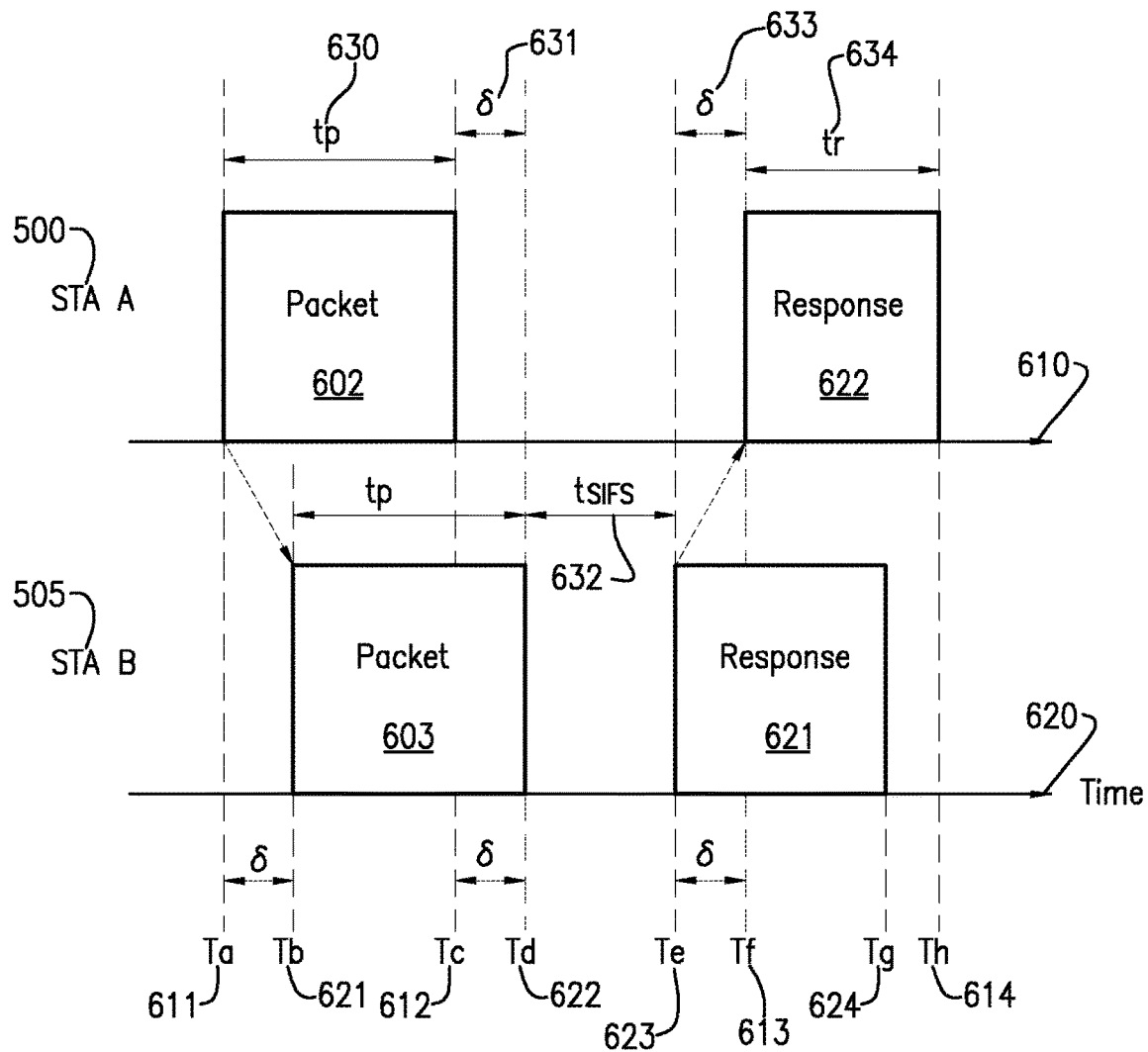
FIG. 6 is a timing diagram describing the active ranging method of the present disclosure in further detail.

FIG. 6 is a timing diagram that describes in further detail the ranging transmission method of the present disclosure. Time axis 610 is the time axis for STA A 500 and time axis 620 is the time axis for STA B 505. At time Ta 611, STA A 500 starts the transmission of packet 602 which is addressed to STA B 505. After a time delay of δ, at time Tb 621, STA B 505 starts to receive packet 603, which ideally is identical to packet 602. Packet 603 may differ in the value of particular bits dues to propagation conditions but in general, packet 602 and packet 603 are the same. At time Tc 612, STA A 500 completes the transmission of packet 602 and at time Td 622, STA B 505 completes the reception of packet 603. The time difference between Tc 612 and Td 622 is δ, the propagation time for the packet to travel from STA A 500 to STA B 505. Note that the time differences (Tc−Ta) and (Td−Tb) are both the duration tp 630 of the transmitted packet 602.

STA B 505 transmits the response packet 621 at time Te 623. Assuming that the response is an ACK or an RTS packet in reply to the received packet 603, time Te ideally will be at a time $t_{SIFS}$ 632 after time Td 622, where $t_{SIFS}$ 632 is the SIFS time as defined in the IEEE 802.11 standard. At time Tf 613, STA A 500 starts to receive the response 622 which ideally is identical to response 621 sent by STA B 505. At time Tg 624, STA B 505 completes the transmission of the response 621 and at time Th 614, STA A 500 completes receiving the response 622. Note that the time differences (Tb−Ta), (Td−Tc), (Tf−Te) and (Th−Tg) are all equal and have the value δ which is the propagation time for the packet and response to travel between the two STAs.

At STA A 500, the time of a packet at the point when the frame check has completed, may be recorded. Hence, if STA A 500, is the measuring station, the time for the transmission of packet 602 that is recorded is Tc 612, and the time that is recorded for the reception of the response 622 is Th 614. In order to calculate the value of δ, it is necessary to know the duration tr 634 of the response 622. Calculating the duration tr 634 is straightforward as the measuring station STA A 500 can monitor the details of the response packet such as data rate and length. In practice therefore, STA A 500 can calculate the value of δ from expression (8):

$$\delta = (Th - Td - tr - t_{SIFS})/2 \qquad (8)$$

Stated another way, STA A 500 begins transmission of ranging packet 602 at a beginning transmission time Ta 611 and ends transmission of the ranging packet 602 at an ending transmission time Tc 612. STA B 505 begins receiving the first ranging packet 602 at a beginning reception time Tb 621 and receives the complete first ranging packet 602 at an ending reception time Td 622, wherein δ is measured as the time between the ending transmission time Tc 612 and the ending reception time Td 622.

Figure 7:
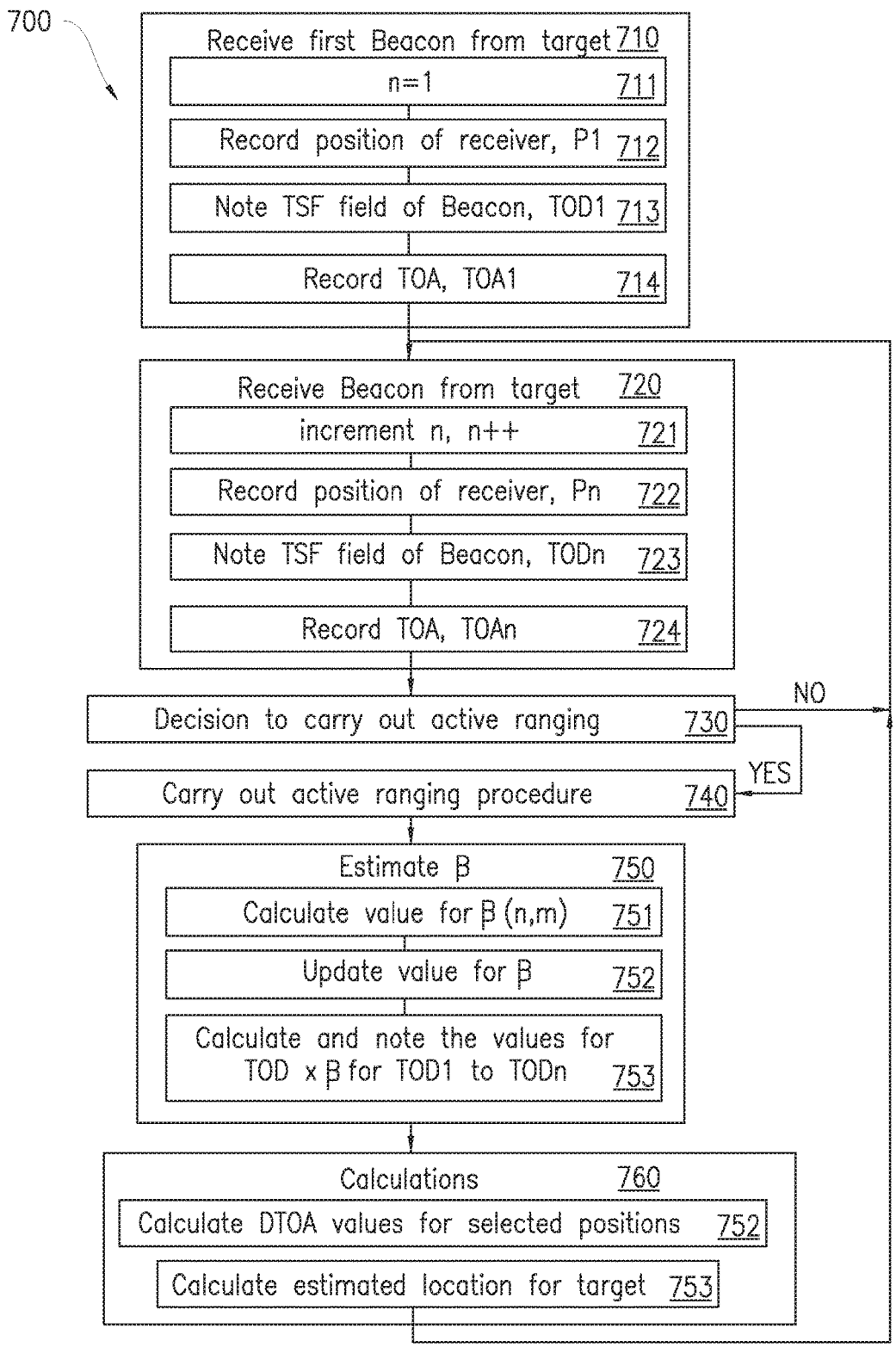
FIG. 7 is a flowchart depicting an exemplary method for locating a wireless device utilizing the principles of the present disclosure.

FIG. 7 illustrates method 700 according to an exemplary embodiment of the disclosure. Method 700 may start with stage 710 with the reception of the first beacon by the measuring receiver 400. Stage 710 may include stage 711 where the beacon reference, n, is initialized. The value of n may be set to 1. Stage 710 may include stage 712 where the position in space, P1, of the measuring receiver 400 is recorded corresponding to the point in time that the beacon was received in stage 710. The position P1 may be obtained by various means such as a GPS receiver, or a navigation system that may be or may not be part of the measuring receiver. Stage 710 may include stage 713 where the value of the TSF field in the received beacon is noted and recorded, TOD1. Stage 710 may also include stage 714 where the value of the TOA of the received beacon, as measured by the measuring receiver, is noted and recorded, TOA1.

Stage 710 may be followed by stage 720 with the reception of further beacons by the measuring receiver 400. Stage 720 may include stage 721 where the beacon reference n is incremented. Stage 720 may include stage 722 where the position in space, Pn, of the measuring receiver 400 is recorded, corresponding to the point in time that the beacon was received in stage 712 included in stage 710. Stage 720 may include stage 723 where the value of the TSF field in the received beacon is noted and recorded, TODn. Stage 720 may include stage 724 where the value of the time of arrival, TOA, of the received beacon, as measured by the measuring receiver 400, is noted and recorded, TOAn.

Stage 720 may be followed by stage 730 where the decision is taken on whether to carry out an active ranging measurement or not. The decision to carry out an active ranging measurement may be based upon a selection of many possible criteria. These criteria may include, but not be limited to, the following: time elapsed since last active ranging measurement, reception of a beacon after a period of no beacon reception, present position of measurement receiver 400 with respect to a previous position, importance of the location with respect to time to locate. In general, it is desirable to carry out a ranging measurement at a time that is close to the reception of a beacon so that that the measured propagation time δ corresponds closely to the delay time of the beacon.

In the case that the decision to carry out an active ranging measurement in stage 730 is positive, then stage 730 may be followed by stage 740 where the active ranging measurement is carried out and a value for the propagation time δn is measured and stored. If the decision in stage 730 is negative, i.e., there is no active ranging procedure being performed, then stage 730 may be followed by stage 720 where the next beacon reception is sought.

Stage 740 may be followed by stage 750 where the relative clock drift β is calculated. Stage 750 may include stage 751 where a value for the relative clock drift, β(n, m) may be calculated. This calculation may be as described in equation (4) using the latest value for δ, δn, and a previous value for δ, δm. Stage 750 may include stage 752 where the value for β may be updated. If a value for β has been previously calculated from previous pairs of TOD and TOA readings, then when a new value of β(n,m) is calculated, in stage 751, the value of β may be updated to a revised value that uses the existing value of β and the new value β(n,m). Such a revision may be a simple averaging or may use a weighted average if the latest calculation for β is perceived as having a higher precision than previous. The precision may be based upon factors such as time between the pair of readings, the longer the better. Stage 750 may include stage 753 where the revised or updated value for the relative clock drift β is used to adjust the time values of all the recorded TODs as per formula (2).

Stage 750 may be followed by stage 760 where the calculations are carried out that determine the geo-location estimate. Stage 760 may include stage 761 where the DTOA values for pairs of readings and positions are calculated as per equation (5). Stage 760 may include stage 762 where the estimated location of the target is calculated. In one embodiment, the mathematical processes used in stage 760 do not form part of this disclosure as they are well known and various.

Figure 8:
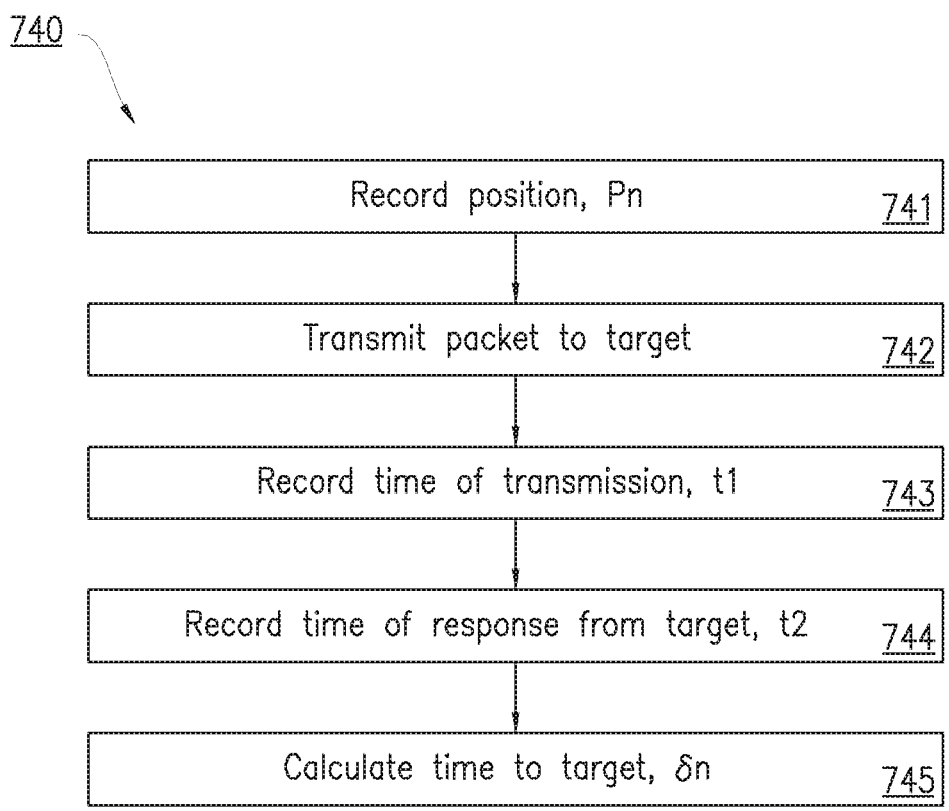
FIG. 8 is a flowchart depicting another embodiment of the present disclosure.

FIG. 8 illustrates an embodiment of stage 740 as shown in FIG. 7, i.e., a way of carrying out the active ranging procedure. Stage 740 may include stage 741 where a position Pn of the measuring receiver 400 is recorded. Stage 740 may include stage 742 where a packet, a "ranging packet," is transmitted to the target station. This packet may be a data packet, a management packet or a control packet. Stage 740 may include stage 743 where a time t1 of the transmission sent in stage 742 is recorded. This time t1 may correspond to Tc 612 as described in FIG. 6, which corresponds to the point in the ranging packet where the frame check is completed. Any known and predetermined point in the packet may be used as the transmission time where the timing of the point can be related to either the start of the transmission or the end of the transmission. Stage 740 may include stage 744 where the time of the response packet from the target station is recorded. At the target station, the successful reception of the transmission from the measuring receiver 400 of the transmission that may be sent in stage 743, will cause a response packet to be sent by the target station. For example, in the cases of a data or management packet being received, the response will be in the form of an acknowledgment (ACK) packet, and in the example of a control RTS packet being received, the response will be a CTS packet. The time t2 that the response packet is received by the measuring receiver is recorded. This time t2 may correspond to Th 614 as described in FIG. 6 which corresponds to the point in the response packet where the frame check is completed. Any known and predetermined point in the packet may be used as the reception time where the timing of the point can be related to either the start or the end of the reception. This point in time may correspond to the time when the frame check is completed. This point in time may be taken at various other points in the received packet, for example the time when the clear channel assessment (CCA) of the measurement receiver was exerted by the packet reception, or the point where the header of the packet is verified. Stage 740 may include stage 745 where the propagation time δ is calculated. This calculation may be carried out using equation (8) or using a similar expression based upon the points in the packets where the timing is recorded.

Figure 9:
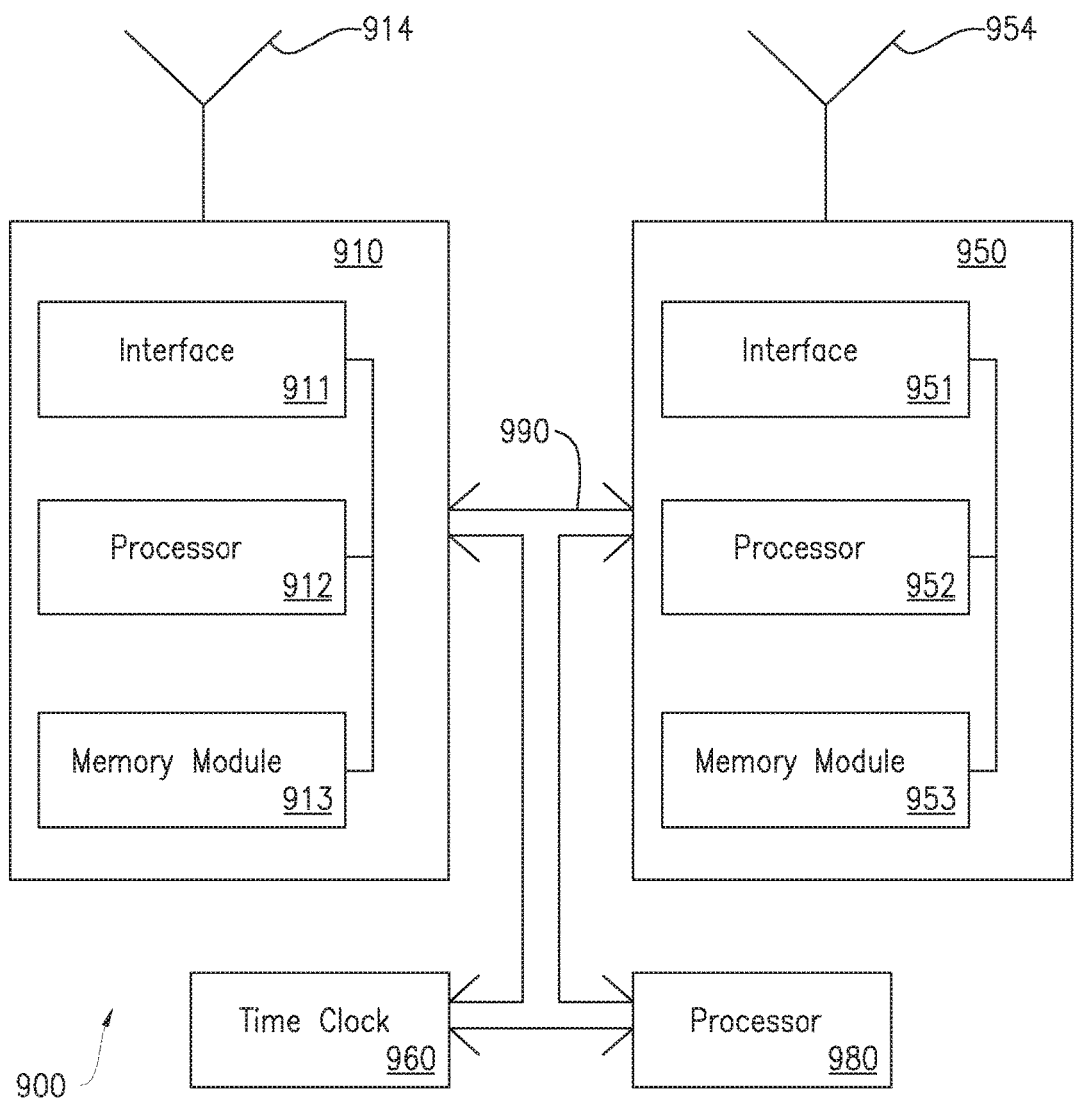
FIG. 9 illustrates an exemplary embodiment of a wireless communication device that may be used as the measuring station utilizing the principles of the present disclosure.

FIG. 9 illustrates a wireless communication device 900 according to an embodiment of the disclosure that may be used as the measuring receiver. The wireless communication device 900 may be any device capable of wirelessly receiving signals and transmitting signals and can execute any of the methods described in the present disclosure. The wireless communication device 900 may be one or more receivers or access points, and the like. The wireless communication device 900 may be one or more wireless devices that are based upon the IEEE 802.11 specification.

The wireless communication device 900 may include a wireless station 910 and a wireless station 950. In one embodiment, the wireless station 910 may be used as a receiver and wireless station 950 may be used as a transmitter or vice versa. In another embodiment, wireless station 910 may be used as a transmitter and a receiver and wireless station 950 not used, or vice versa. In another embodiment, both wireless stations 910 and 950 may be used as transmitters and receivers. It will be appreciated by persons skilled in the art that various combinations of transmitter and receiver may be used. The embodiment described herein is where wireless station 910 is used as a receiver and station 950 is used as a transmitter. The wireless measuring station may also include a time clock 960 and a processor 980 which are interconnected to the two stations 910 and 950 by a data bus 990.

Wireless station 910 includes interface 911, processor 912, memory module 913 and one or more wireless antennas such as wireless antennas 914. The interface 911 may be a wireless receiver. It may include, for example, at least a part of an analog and/or digital front end of a receiver. The interface 911 and/or the processor 912 may include measurement elements for measuring and/or calculating attributes of received signals (input signals). The interface 911 and/or the processor 912 may include monitoring elements for monitoring attributes of received signals by the antenna 914.

Wireless station 950 may include interface 951, processor 952, memory module 953 and one or more wireless antennas such as wireless antennas 954. The interface 951 may be a wireless transmitter. It may include, for example, at least a part of an analog and/or digital front end of a transmitter. The interface 951 and/or the processor 952 may include measurement elements for measuring, calculating and/or processing management, data and control packets for transmission via the antenna 954. The interface 951 and/or the processor 952 may include elements for the transmission of packets via the antenna 954.

According to an embodiment of the disclosure, the interface 911 is arranged to receive input signals and the processor 912 is arranged to measure and monitor an input signal's attributes, including the beacon packet transmitted by an access point that is based upon the IEEE 802.11 standard. Also, the interface 911 is arranged to receive input signals and the processor 912 is arranged to measure and monitor an input signal's attribute, including data and control packets transmitted by an access point or station that is based upon the IEEE 802.11 standard. Such control packets include ACK, RTS and CTS packets. The memory module 913 may store instructions for executing any method disclosed in the present disclosure, input signals, and results of processing of the processor 912, signals to be outputted or the like.

According to an embodiment of the disclosure the interface 951 is arranged to transmit signals and the processor 952 is arranged to prepare the transmitted signal attributes based upon the IEEE 802.11 standard. Such transmitted packets include data packets, control packets and management packets that are to be transmitted by a wireless station that is based upon the IEEE 802.11 standard. Such control packets include null data packets and CTS packets. The memory module 953 may store instructions for executing any method disclosed in the present disclosure, input signals, and results of processing of the processor 912, signals to be outputted or the like.

According to an embodiment of the disclosure, the interface 911 is arranged to receive transmissions of another wireless communication device and the processor 912 is arranged to monitor one or more attributes of the beacon transmissions of the other wireless communication device, and determine the value of the TSF field in the beacons of the other wireless communication device. In addition, according to an embodiment of the disclosure, the interface 911 is arranged to measure the time of arrival of the received beacon transmissions of the other wireless device. In addition, according to an embodiment of the disclosure, the interface 911 is arranged to measure the time of departure of the transmissions from the wireless station 950. This may be accomplished by outputting the value of the TSF timer of the wireless communication device 910 at the point where the frame check is carried out. This may also be accomplished by outputting a trigger that is timed to coincide with the reception of the beacon from the other wireless device. This trigger may then be used to read the time from the time clock 960. Time clock 960 may have a precision that is higher than the internal TSF timer that is part of the wireless communications device 910.

According to an embodiment of the disclosure, the interface 951 may be arranged to transmit packets to another wireless communication device and the processor 952 may be arranged to prepare the attributes of the packet to be transmitted.

According to an embodiment of the disclosure, the processor 980 may be used to control the operations of the wireless communication device 900 and in particular the two wireless stations 910 and 950. The processor 980 may also carry out the various calculations as described in this disclosure and may also prepare the measurement results for disclosure to an operator or user.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the criteria for determining a position as being a candidate for the transmission of a ranging packet, the calculation of the relative drift between clocks, the methods for updating the drift coefficient β, the details of the measuring receiver, the method of measuring the time of arrival, the use of the internal TSF timer and an external time source to increase the accuracy, the use of more than one measuring receiver, the details of the ranging transmission, the time of departure measurement for the ranging transmission. Accordingly the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method of determining a location of a wireless device, the method comprising:

identifying a departure time difference between a first Time of Departure ($TOD_n$) of a first beacon transmitted from the wireless device according to a clock associated with the wireless device, and a second $TOD_m$ of a second beacon transmitted from the wireless device to the measuring station according to the clock associated with the wireless device;

identifying an arrival time difference between a first Time of Arrival ($TOA_n$) of the first beacon according to a clock associated with the measuring station and a second $TOA_m$ of the second beacon at the measuring station according to the clock associated with the measuring station;

determining a first propagation time $\delta_n$ represented by a time interval between sending, by the measuring station, a first ranging packet to the wireless device and receiving, by the wireless device, the first ranging packet;

determining a second propagation time $\delta_m$ represented by a time interval between sending, by the measuring station, a second ranging packet to the wireless device and receiving, by the wireless device, the second ranging packet;

the first propagation time and the second propagation time $\delta$ according to the clock associated with the measuring station being determined according to $\delta = (T_h - T_c - T_{SIFS} - t_r)/2$, where:

$T_c$ is a time when the measuring station finishes sending the first ranging packet to the wireless device;

$T_h$ is a time when the measuring station receives a complete first response packet from the wireless device;

$T_{SIFS}$ is an interval between a time when the wireless device receives a complete first ranging packet and a time when the wireless device starts transmission of a first response packet to the measuring station; and $t_r$ is a duration of the first response packet; and determining a relative drift between the clock associated with the wireless device and the clock associated with the measuring station, the relative drift based at least upon the departure time difference, the arrival time difference, the first propagation time $\delta_n$ and the second propagation time $\delta_m$, the relative drift $\beta$ being determined according to $\beta = [(TOA_n - TOA_m) - (\delta_n - \delta_m)]/(TOD_n - TOD_m)$;

revising a previously determined relative drift to arrive at an adjusted relative drift by averaging the previously determined relative drift and the determined relative drift; and determining the location of the wireless device based at least in part on the adjusted relative drift.

2. The method of claim 1, further comprising adjusting at least one of the first TOD and the second TOD according to the determined relative drift.

3. The method of claim 2, wherein determining the location of the wireless device includes the adjusted at least one of the first TOD and the second TOD.

4. The method of claim 1, further comprising updating the relative drift each time a subsequent ranging packet is sent from the measuring station to the wireless device.

5. The method of claim 1, wherein a decision to transmit at least one of the first ranging packet and the second ranging packet is based at least upon a position of the measuring station.

6. The method of claim 1, wherein the wireless device is a wireless access point.

7. The method of claim 1, wherein the first ranging packet transmitted by the measuring station is a ready-to-send (RTS) control packet and the first response packet transmitted by the wireless device is a clear-to-send (CTS) control packet.

8. A measuring station for determining a location of a wireless device, the measuring station comprising:

an interface configured to:
transmit, to the wireless device, a first and second ranging packets;
receive, from the wireless device, first and second beacons;

a processor; and a memory storing instructions that, when executed, configure the processor to:

identify a departure time difference between a first Time of Departure ($TOD_n$) of the first beacon transmitted from the wireless device according to a clock associated with the wireless device, and a second $TOD_m$ of a second beacon transmitted from the wireless device according to the clock associated with the wireless device;

identify an arrival time difference between a first Time of Arrival ($TOA_n$) of the first beacon at the measuring station according to a clock associated with the measuring station and a second $TOA_m$ of the second beacon at the measuring station according to the clock associated with the measuring station;

determine a first propagation time $\delta_n$ represented by a time interval between sending the first ranging packet to the wireless device and receipt of the first ranging packet by the wireless device;

determine a second propagation time $\delta_m$ represented by a time interval between sending the second ranging packet to the wireless device and receipt of the second ranging packet by the wireless device;

the first propagation time and the second propagation time $\delta$ according to the clock associated with the measuring station being determined according to $\delta = (Th - Tc - TSIFS - tr)/2$, where:

Tc is a time when the measuring station finishes sending the first ranging packet to the wireless device;

Th is a time when the measuring station receives a complete first response packet from the wireless device;

TSIFS is an interval between a time when the wireless device receives a complete first ranging packet and a time when the wireless device starts transmission of a first response packet to the measuring station; and tr is a duration of the first response packet; and determine a relative drift between the clock associated with the wireless device and the clock associated with the measuring station, the relative drift based at least upon the departure time difference, the arrival time difference, the first propagation time $\delta_n$ and the second propagation time $\delta_m$, the relative drift $\beta$ being determined according to $\beta = [(TOA_n - TOA_m) - (\delta_n - \delta_m)]/(TOD_n - TOD_m)$;

revise a previously determined relative drift to arrive at an adjusted relative drift by averaging the previously determined relative drift and the determined relative drift; and determine the location of the wireless device based at least in part on the adjusted relative drift.

9. The measuring station of claim 8, wherein the memory further stores instructions that, when executed by the processor further configure the processor to adjust at least one of the first TOD and the second TOD according to the determined relative drift.

10. The measuring station of claim 9, wherein determining the location of the wireless device includes the adjustment of the at least one of the first TOD and the second TOD.

11. The measuring receiver of claim 8, wherein the memory further stores instructions that, when executed by the processor further configure the processor to update the relative drift each time a subsequent ranging packet is sent from the measuring station to the wireless device.

12. The measuring station of claim 8, wherein a decision to transmit at least one of the first ranging packet and the second ranging packet is based at least upon a position of the measuring station.

* * * * *